United States Patent
Minami

(10) Patent No.: US 9,789,474 B2
(45) Date of Patent: Oct. 17, 2017

(54) EXHAUST GAS PURIFICATION CATALYST

(71) Applicant: TOYOTA JIDOSHA KABUSHIKI KAISHA, Toyota-shi, Aichi-ken (JP)

(72) Inventor: Keiichi Minami, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/090,994

(22) Filed: Apr. 5, 2016

(65) Prior Publication Data

US 2016/0296920 A1 Oct. 13, 2016

(30) Foreign Application Priority Data

Apr. 13, 2015 (JP) .................. 2015-081839

(51) Int. Cl.
| | | |
|---|---|---|
| *B01J 29/076* | (2006.01) | |
| *B01J 27/188* | (2006.01) | |
| *B01J 35/00* | (2006.01) | |
| *B01J 29/072* | (2006.01) | |
| *B01J 23/00* | (2006.01) | |
| *B01D 53/94* | (2006.01) | |
| *B01J 27/02* | (2006.01) | |
| *B01J 35/02* | (2006.01) | |

(52) U.S. Cl.
CPC ........ *B01J 29/076* (2013.01); *B01D 53/9418* (2013.01); *B01J 23/002* (2013.01); *B01J 27/02* (2013.01); *B01J 27/188* (2013.01); *B01J 35/008* (2013.01); *B01J 35/023* (2013.01); *B01D 2251/2062* (2013.01); *B01D 2255/2065* (2013.01); *B01D 2255/20707* (2013.01); *B01D 2255/20761* (2013.01); *B01D 2255/20776* (2013.01); *B01D 2255/40* (2013.01); *B01D 2255/90* (2013.01); *B01J 29/072* (2013.01); *B01J 2523/00* (2013.01)

(58) Field of Classification Search
CPC ....... B01J 27/188; B01J 29/072; B01J 29/076
See application file for complete search history.

(56) References Cited

U.S. PATENT DOCUMENTS

| | | | | |
|---|---|---|---|---|
| 5,116,586 A | * | 5/1992 | Baacke | B01D 53/9418 423/239.2 |
| 5,328,672 A | * | 7/1994 | Montreuil | B01D 53/945 423/212 |
| 5,422,333 A | * | 6/1995 | Kano | B01D 53/9418 423/213.2 |

(Continued)

FOREIGN PATENT DOCUMENTS

| | | |
|---|---|---|
| JP | S57-127426 A | 8/1982 |
| JP | H02-194819 A | 8/1990 |

(Continued)

OTHER PUBLICATIONS

Reinhold et al, CA2010970A1, publication date Feb. 27, 1990.*

(Continued)

*Primary Examiner* — Jun Li
(74) *Attorney, Agent, or Firm* — Oliff PLC

(57) ABSTRACT

The problem to be solved by the present invention is to provide a good NOx selective reduction catalyst. To solve the problem is a NOx selective reduction catalyst containing a composite oxide of Ti, Ce, W, and P or S.

2 Claims, 1 Drawing Sheet

EXAMPLES 5 AND 6

(56) References Cited

U.S. PATENT DOCUMENTS

| | | | |
|---|---|---|---|
| 6,555,492 B2* | 4/2003 | Faber | B01J 29/46 502/64 |
| 2002/0025905 A1* | 2/2002 | Harris | B01D 53/9431 502/309 |
| 2005/0130836 A1 | 6/2005 | Kato et al. | |
| 2008/0038174 A1* | 2/2008 | Mori | B01D 53/9413 423/237 |
| 2010/0267548 A1* | 10/2010 | Andersen | B01D 53/8628 502/20 |
| 2010/0290963 A1* | 11/2010 | Andersen | B01D 53/9418 423/213.2 |
| 2011/0182791 A1* | 7/2011 | Fedeyko | B01D 53/9436 423/237 |
| 2013/0336866 A1 | 12/2013 | Soeger et al. | |
| 2014/0170032 A1 | 6/2014 | Yang et al. | |
| 2015/0030507 A1* | 1/2015 | Nobukawa | B01D 53/9418 422/170 |
| 2015/0224486 A1* | 8/2015 | Bauer | B01J 37/0246 423/213.5 |

FOREIGN PATENT DOCUMENTS

| | | |
|---|---|---|
| JP | H08-257402 A | 10/1996 |
| JP | 2003-251180 A | 9/2003 |
| JP | 2008-49289 A | 3/2008 |
| JP | 2014-512940 A | 5/2014 |
| JP | 2014-515311 A | 6/2014 |
| NO | 2005/082494 A1 | 9/2005 |

OTHER PUBLICATIONS

Pereda-Ayo et al., Role of the different copper species on the activity of Cu/zeolite catalysts for SCR of NOx with NH3, (Applied Catalysis B: Environmental, 147 (2014): p. 420-428.*

* cited by examiner

COMPARATIVE EXAMPLE 1

EXAMPLES 5 AND 6

EXHAUST GAS PURIFICATION CATALYST

TECHNICAL FIELD

The present invention relates to a NOx selective reduction catalyst. More specifically, the present invention relates to a TiCeW-based NOx selective reduction catalyst capable of selectively reducing nitrogen oxide.

BACKGROUND ART

When an engine performs combustion in an excess oxygen atmosphere, an exhaust gas containing carbon monoxide, hydrocarbon, nitrogen oxide (NOx), etc., is discharged from the engine. As a catalyst for reducing NOx which is discharged in an oxygen excess atmosphere, by using a reducing agent such as ammonia, a catalyst of a Selective Catalytic Reduction (SCR) type has been known.

Under these circumstances, Patent Document 1 describes, for example, a catalyst having supported therein titanium hydroxide, tungstic acid or salts thereof, cerium dioxide, etc., for removing nitrogen oxide by using ammonia as a reducing agent (e.g., claims 1, 8 and 9 of Patent Document 1).

RELATED ART

Patent Document

[Patent Document 1] Japanese Unexamined Patent Publication No. 2003-251180

SUMMARY OF THE INVENTION

Problems to be Solved by the Invention

However, with respect to the above-described catalytic reduction-type NOx catalyst such as copper-supported zeolite, under high-temperature conditions of, e.g., 500° C., Cu catalyzes an oxidation reaction of $NH_3$ on the surface of zeolite to produce NOx, and the reducing agent lacks, resulting in that NOx cannot be reduced and the NOx purification rate at high temperatures abruptly decreases. Therefore, a catalytic reduction-type catalyst ensuring a high NOx purification rate at high temperatures has been demanded.

Means to Solve the Problems

As a result of intensive efforts, the present inventors have found that when a composite oxide obtained by adding P and/or S to a mixture of Ti, Ce and W is used as a catalyst, surprisingly, the reduction efficiency, etc., of the catalyst at a high temperature of, e.g., 500° C. can be greatly enhanced and in turn, a catalyst having an excellent NOx selective reduction activity can be provided. The present invention has been accomplished based on this finding.

An embodiment of the present invention is as follows.
<1> A NOx selective reduction catalyst including a composite oxide of Ti, Ce, W, and P or S.
<2> The NOx selective reduction catalyst according to item <1>, which is of a core/shell type including the core part containing zeolite and Cu and the shell part containing the composite oxide.

Effects of the Invention

According to an embodiment of the present invention, a NOx selective reduction catalyst capable of maintaining a high NOx purification rate under high-temperature conditions of, e.g., 500° C., compared with the conventional copper-supported zeolite, can be provided. Furthermore, the catalyst is configured to have a core/shell structure in which the core part is a copper-supported zeolite and the shell part is a composite oxide, whereby a NOx selective reduction catalyst capable of exhibiting remarkably improved NOx purification rate not only under high-temperature conditions but also under low-temperature conditions, can be provided.

DETAILED DESCRIPTION OF THE INVENTION

Figure 1:
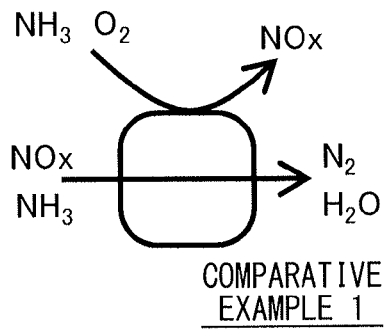
FIG. 1 is a diagram depicting schematic views of the structure and mechanism of the catalyst of Comparative Example 1.

In the description of the present invention, particle size refers to the diameter of a particle and in the case where the particle is not a sphere, it is the maximum diameter of the particle.

The pore size refers to the diameter of a pore and in the case where the cross-section of the pore is not a circle, it is the diameter of a circle having the same area as the cross-section area.

The NOx selective reduction catalyst according to an embodiment of the present invention contains a composite oxide containing titanium (Ti), cerium (Ce), tungsten (W), and phosphorus (P) and/or sulfur (S).

The composite oxide according an embodiment of the present invention includes a mixture of oxides with respective constituent components Ti, Ce, W, and P and/or S, a solid solution containing these components, and combination thereof.

This composite oxide indicates an oxide having a main peak of an anatase $TiO_2$ crystal at 25.2° as measured by XRD analysis.

The composite oxide may contain, relative to 100 mol % of Ti, W in a ratio of about 1 mol % or more, about 3 mol % or more, about 5 mol % or more, about 8 mol % or more, or about 10 mol % or more, and about 20 mol % or less, about 17 mol % or less, about 15 mol % or less, or about 12 mol % or less; P in a ratio of about 1 mol % or more, about 3 mol % or more, about 4 mol % or more, or about 5 mol % or more, and about 10 mol % or less, about 8 mol % or less, or about 6 mol % or less; and Ce and S each in a ratio of about 0.5 mol % or more, about 1 mol % or more, about 2 mol % or more, or about 3 mol % or more, and about 10 mol % or less, about 8 mol % or less, about 6 mol % or less, or about 4 mol % or less.

Above all, relative to 100 mol % of Ti, the content of W is preferably about 8 mol % or more and about 12 mol % or less, the content of P is preferably about 4 mol % or more and about 6 mol % or less, and the content of each of Ce and S is preferably about 2 mol % or more and about 4 mol % or less.

In this composite oxide, the respective components of the composite oxide are homogeneously dispersed in the oxide. In other words, in a volume of arbitrary size of the composite oxide, the ratio of respective components of the composite oxide has a margin of error within about ±30% relative to the charge ratio of respective elements, in terms of atom ratio.

In this composite oxide, the particle size may be about 10 nm or more, and about 20 nm or less, or about 30 nm or less. When this composite oxide has a pore, the pore size may be about 5 nm or more, and about 10 nm or less, or about 20 nm or less.

In addition to the above-described constituent components, unless a problem arises in particular, the composite oxide may contain about 50 mol % or less of at least one of silica, alumina and zirconia, relative to 100 mol % of Ti.

The catalyst according to an embodiment of the present invention may have a core/shell structure in which the shell is the composite oxide and the core is another component.

As the material used for the core, a mixture of an inorganic oxide such as transition metal oxide and zeolite, and an oxidizable/reducible metal element such as copper (Cu), manganese (Mn), cobalt (Co) and iron (Fe), may be used.

The core may contain from about 2 parts by mass to about 50 parts by mass of a metal element per 100 parts by mass of an inorganic oxide, and the core itself may have a size ranging from about 10 nm to about 5 μm in terms of length, width, and height.

The core/shell material may contain from about 90 wt % to about 99.5 wt % of a core material based on 100 wt % of the total of the core and the shell, and the thickness of the shell part may be from about 1 nm to about 100 nm, preferably from about 5 nm to about 50 nm, more preferably from about 10 nm to about 20 nm.

The composite oxide according to an embodiment of the present invention is not particularly limited, unless a problem arises, and may be obtained by a known method, which includes mixing a cerium compound such as a cerium nitrate, and a titanium compound such as a titanic acid, for example, meta-titanic acid, ortho-titanic acid, and alkoxide thereof, a hydrous titanium oxide slurry and dried product thereof, and a titania sol, to produce a sol; adding a phosphoric acid and/or a sulfate such as ammonium sulfate to a tungstic compound such as ammonium para-tungstate, oxoacid of tungsten, and salts thereof, to produce the resultant, and, if desired, further adding a pH adjusting agent such as oxalic acid and acetic acid and/or a binder such as silica sol to the resultant to mix, and thereby producing a tungsten-containing aqueous solution; and after adding the tungsten-containing aqueous solution to the sol above by means of dropping, etc., to obtain a gel, which is further dried at from about 100° C. to about 140° C. for from about 8 hours to about 20 hours, calcined at a temperature of from about 500° C. to about 700° C. for from about 3 hours to about 7 hours, and shaped by pressing at a press pressure of from about 0.5 t to about 3 t.

The core/shell catalyst according to an embodiment of the present invention is not particularly limited, unless a problem arises, and may be obtained by a known method, which includes adding the sol above in a desired charge amount to a mixed solution of copper zeolite and ethanol, etc., to coat the surface of a core material with TiCe sol, further adding the tungsten-containing solution to the mixed solution to form a gel, which is similarly dried, calcined, and shaped.

In the catalyst according to the present invention, as described in detail below, P and/or S are added to a Ti—Ce—W-based mixture to make a composite oxide, whereby, surprisingly, the NOx purification rate and the $NH_3$ oxidation rate at 500° C. are improved (Examples 1 to 4) and furthermore, good results are obtained compared with the conventional Cu-supported zeolite (Comparative Example 2).

In particular, the catalyst according to an embodiment of the present invention is configured to have a core/shell structure in which the core part is a Cu-supported zeolite and the shell part is the composite oxide, rather than configured by mixing the composite oxide with a conventional Cu-supported zeolite. Due to this core/shell structure, the NOx purification rate and the $NH_3$ oxidation rate are remarkably improved, compared to the mixture, not only at 500° C. but also at a low temperature of 250° C. (Examples 5 and 6, and Reference Example 1). Further, due to this core/shell structure, far higher NOx purification rate and $NH_3$ oxidation rate can be exhibited, compared with the Cu-supported zeolite (Comparative Example 1).

Although not wishing to be bound by any theory, the reason why the catalyst according to the present invention can exhibit such excellent performances is believed to be as follows.

First, in the inside of the conventional Cu-supported zeolite, ion-exchanged Cu acts as an active site, and reduction of NOx by $NH_3$ is performed. On the catalyst surface, Cu is easy to be oxidized and likely to turn into copper oxide. In addition, $NH_3$ is oxidized by reacting with oxygen on the surface, and NOx is thereby produced (FIG. 1, Comparative Example 1). Since $NH_3$ for reducing NOx is consumed by oxidation, the reducing agent lacks, and NOx cannot be purified. These occur at the same time, as a result, it is believed that the activity decrease abruptly in a high-temperature region.

On the other hand, in the catalyst according to an embodiment of the present invention, as described in detail below, P and/or S are further added to a mixture of Ce as a redox site, Ti, and W as a high-acidity element, and the amounts of respective components are controlled. Therefore, although not wishing to be bound by any theory, for example, it is believed that because the $NH_3$ oxidation site occupancy is optimized by decreasing the redox site occupancy to a minimum necessary, and/or because the $NH_3$ retaining capacity is strengthened by the addition of P, S and W which are elements having high $NH_3$ adsorption power and high electronegativity, the SCR activity is specifically developed, and oxidation of $NH_3$ can be suppressed (Examples 1 to 4, Comparative Example 2).

Figure 2:
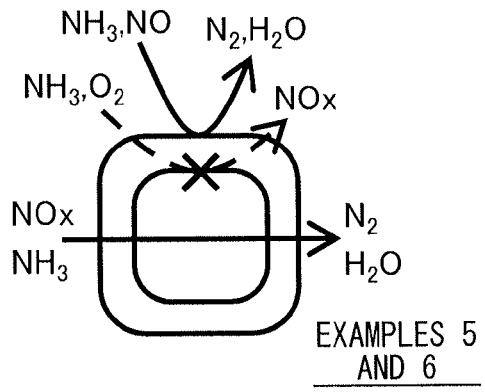
FIG. 2 is a diagram depicting schematic views of the structure and mechanism of the catalyst of Examples 5 and 6.

Furthermore, in the catalyst according to an embodiment of the present invention, a core/shell structure in which the core part is a Cu-supported zeolite and the shell part is the composite oxide, is formed. Although not wishing to be bound by any theory, it is believed that due to this structure, while the SCR activity specific to the shell predominates at a high temperature, the SCR activity of the core material predominates at a low temperature, and the $NH_3$ oxidation at a high temperature is thereby suppressed (FIG. 2, Examples 5 and 6), as a result, $NH_3$ is effectively utilized for the reduction of NOx and a good NOx purification rate can be maintained.

It is believed that such a mechanism enables the catalyst according to the present invention to effectively inhibit $NH_3$ oxidation and to effectively reduce NOx not only at a high temperature but also at a low temperature, and, as a result, the catalyst according to the present invention provides a far excellent effect compared with the conventional copper-supported zeolite.

EXAMPLES

The present invention is described more specifically below by referring to Examples, but the present invention is not limited to these Examples.

In Examples, etc., each measurement was performed under the following conditions and by the following procedure.

(Measurement of NOx Purification Rate)

The activity of the catalyst was evaluated under the following conditions:

Catalytic activity evaluation apparatus: Model No.: MEXA7100F, manufactured by Hitachi High-Technologies Corp.

Evaluation conditions: continuous temperature drop to 100° C. at 10° C./min from 600° C.

Composition of test gas: in volume ratio, $NH_3$: 400 Ppm, NO: 300 ppm, $H_2O$: 5%, $CO_2$: 10%, $O_2$: 10%, remainder: $N_2$ Amount of sample: 5 ml Hourly space velocity: 180,000 $h^{-1}$ (Measurement of $NH_3$ Oxidation Rate)

The ratio of $NH_3$ oxidized to $N_2O$, NO and $NO_2$ was calculated from the data in (Measurement of NOx Purification Rate). Out of the $NH_3$ consumption, half of the $NH_3$ amount after subtracting the portion consumed by NOx purification was oxidized to NOx, and the total of this amount oxidized to NOx and the produced $N_2O$ and $NO_2$ was calculated as the $NH_3$ oxidation rate.

For performing the sample evaluation, a sample was obtained as follows.

Example 1 ($Ti_{100}Ce_3W_{10}P_3$ Composite Oxide)

In a beaker, 0.0045 mol (1.95 g) of cerium nitrate was added to 200 g of ethanol and dissolved, and 0.15 mol (42.63 g) of titanium tetraisopropoxide was added thereto to obtain a sol. In another beaker, 0.015 mol (3.92 g) of ammonium para-tungstate was added to 50 ml of an aqueous 5% oxalic acid solution and dissolved, and 0.0045 mol (0.44 g) of phosphoric acid was added thereto to prepare a tungsten-containing aqueous solution. The obtained tungsten-containing aqueous solution was added dropwise to the sol to produce a gel. The obtained gel was dried at 120° C. over 12 hours before raising the temperature to 600° C. over 3 hours, calcined at this temperature over 5 hours to obtain a composite oxide. The obtained composite oxide was pressed at a press pressure of 1 t to obtain a pellet-shaped measurement sample.

Example 2 ($Ti_{100}Ce_3W_{10}P_5$)

A sample was obtained in the same manner as in Example 1 other than using 0.0075 mol (0.735 g) of phosphoric acid in Example 1.

Example 3 ($Ti_{100}Ce_3W_{10}S_{0.5}$)

A sample was obtained in the same manner as in Example 1 other than using 0.00075 mol (0.10 g) of ammonium sulfate in place of phosphoric acid in Example 1.

Example 4 ($Ti_{100}Ce_3W_{10}S_3$)

A sample was obtained in the same manner as in Example 1 other than using 0.0045 mol (0.60 g) of ammonium sulfate in Example 3.

Example 5 (95 wt % Cu-Supported Zeolite/5 wt % $Ti_{100}Ce_3W_{10}P_5$-Core/Shell)

In a beaker, 21.83 g of Cu-supported zeolite was added to 200 g of ethanol and while stirring, 0.0003 mol (0.13 g) of cerium nitrate and subsequently 0.01 mol (2.84 g) of titanium tetraisopropoxide were added to apply a Ti—Ce sol coating on the surface of the Cu-supported zeolite core. In another beaker, 0.001 mol (0.26 g) of ammonium para-tungstate was dissolved in 10 ml of an aqueous 5% oxalic acid solution, and 0.0005 mol (0.049 g) of phosphoric acid was added thereto to prepare a tungsten-containing aqueous solution. The obtained tungsten-containing aqueous solution was added dropwise to the sol to produce a gel. The obtained gel was dried at 120° C. over 12 hours before raising the temperature to 600° C. over 3 hours, calcined at this temperature over 5 hours to obtain a core/shell particles. The obtained core/shell particles was pressed at a press pressure of 1 t to obtain a pellet-shaped sample of approximately from 2 to 3 mm in width×approximately from 2 to 3 mm in height×approximately from 2 to 3 mm in length.

Further, measurement by TEM revealed that the particle size of the core was 4 μm and the thickness of the shell was from 10 to 20 nm.

Example 6 (95 wt % Cu-Supported Zeolite/5 wt % $Ti_{100}Ce_3W_{10}P_3$-Core/Shell)

A sample was obtained in the same manner as in Example 5 other than in Example 5, 21.11 g of Cu-supported zeolite (Cu content: from 2 to 4 wt %) was used and 0.0003 mol (0.04 g) of ammonium sulfate was used in place of phosphoric acid.

In this case, the core had a particle size of about 4 μm, and the shell had a thickness of approximately from 10 to 20 nm.

Comparative Example 1 (Cu-Supported Zeolite)

A commercially available Cu-supported zeolite (Cu content: from 2 to 4 wt %) was used as it is.

Comparative Example 2 ($Ti_{100}Ce_3W_{10}$)

A sample was obtained in the same manner as in Example 1 other than using an aqueous tungsten-containing solution containing no phosphoric acid in Example 1.

Reference Example 1 (Mixture of 95 wt % Cu-Supported Zeolite+5 wt % $Ti_{100}Ce_3W_{10}S_3$)

9.5 g of Cu-supported zeolite and 0.5 g of $Ti_{100}Ce_3W_{10}S_3$ composite oxide obtained in Example 4 were mixed in a mortar for 10 minutes to obtain a mixed powder, and the mixed powder was pressed at a press pressure of 1 t to obtain a pellet-shaped measurement sample.

With respect to the samples of Examples 1 to 4, Comparative Examples 1 and 2, and Reference Example 1, the NOx purification rate and the $NH_3$ oxidation rate were evaluated. The results are shown in Table 1 below.

TABLE 1

NOx Purification Rate and NH₃ Oxidation Rate at High Temperature

| | | NOx Purification Rate (250° C.)/% | NOx Purification Rate (500° C.)/% | NH$_3$ Oxidation Rate (500° C.)/% |
|---|---|---|---|---|
| Example 1 | $Ti_{100}Ce_3W_{10}P_3$ | 16 | 89 | 1 |
| Example 2 | $Ti_{100}Ce_3W_{10}P_5$ | 10 | 84 | 1 |
| Example 3 | $Ti_{100}Ce_3W_{10}S_{0.5}$ | 15 | 88 | 1 |
| Example 4 | $Ti_{100}Ce_3W_{10}P_3$ | 9 | 90 | 1 |
| Comparative Example 1 | Cu/zeolite | 88 | 80 | 11 |
| Comparative Example 2 | $Ti_{100}Ce_3W_{10}$ | 39 | 75 | 1 |
| Example 5 | Core: 95 wt % of Comparative Example 1/shell: 5 wt % of Example 2 | 88 | 87 | 5 |
| Example 6 | Core: 95 wt % of Comparative Example 1/Shell: 5 wt % of Example 4 | 88 | 90 | 4 |
| Reference Example 1 | Powder mixture of 95 wt % of Comparative Example 1 and 5 wt % of Example 4 | 82 | 75 | 10 |

As shown in Table 1, it was proved that when P or S is added to a Ti—Ce—W-based mixture, the NOx purification rate at 500° C. is enhanced from 75% (Comparative Example 2) to a range of 84 to 90% (Examples 1 to 4) and the samples of Examples 1 to 4 exhibit an excellent NOx purification rate even in comparison to 80% of the conventional Cu-supported zeolite (Comparative Example 1).

Next, Reference Example 1 that is a mixed powder of the sample of Comparative Example 1 and the sample of Example 4 succeeded in providing good results as above, and Examples 5 and 6 in which the core part is the sample of Comparative Example 1 and the shell part is each of the samples of Examples 2 and 4 succeeded in providing good results as above, were examined.

Figure 3:
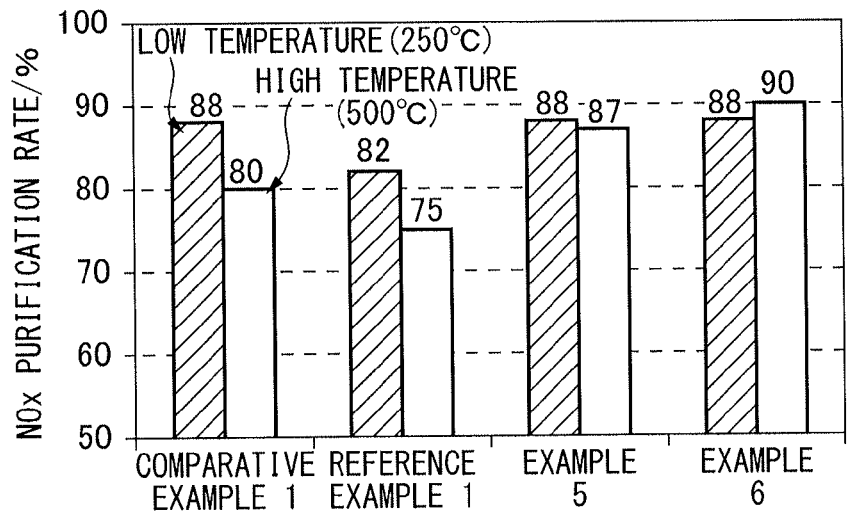
FIG. 3 is a diagram showing the NOx purification rate (%) at a low temperature (250° C.) and a high temperature (500° C.) regarding the samples of Examples 5 and 6, Comparative Example 1, and Reference Example 1.
Figure 4:
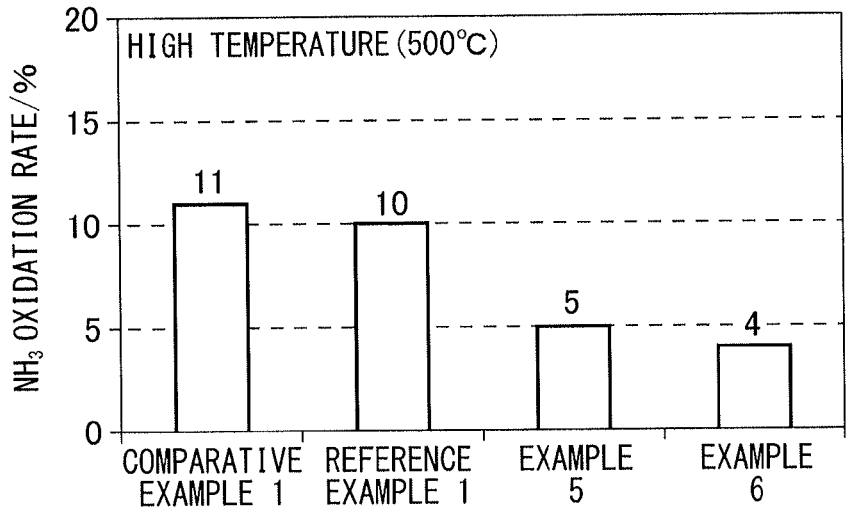
FIG. 4 is a diagram showing the $NH_3$ oxidation rate (%) at a high temperature (500° C.) regarding the samples of Examples 5 and 6, Comparative Example 1, and Reference Example 1.

As shown in Table 1, the NOx purification rate and NH$_3$ oxidation rate at 500° C. were 75% and 10%, respectively (Reference Example 1, FIGS. 3 and 4). When each of these is compared to 80% and 11% of the conventional Cu-supported zeolite (Comparative Example 1), the NOx purification rate is rather decreased. This result proves that a mere mixture of a composite oxide and a Cu-supported zeolite is not so much effective in enhancing the purification rate and oxidation rate.

On the other hand, when the Cu-supported zeolite as the core is coated with 5 wt % composite oxide as the shell, surprisingly, the NOx purification rate and NH$_3$ oxidation rate at 500° C. are remarkably improved to a range of 87 to 90% and a range of 5 to 4%, respectively (Examples 5 and 6, FIGS. 3 and 4). Moreover, the NOx purification rate at 250° C. is 88% and 88% in respective samples (Examples 5 and 6, FIG. 3), and these values are higher than 82% of the mixture (Reference Example 1) and are a good value in no way inferior to 88% of the conventional Cu-supported zeolite (Comparative Example 1).

From these results, it is verified that when P or S is added to a Ti—W—Ce-based catalyst, the Ti—W—Ce-based catalyst is maintained in a good state and by forming a core/shell structure with a Cu-supported zeolite, good results can be obtained.

INDUSTRIAL APPLICABILITY

As described on the foregoing pages, the exhaust gas purifying catalyst according to the present invention has a good performance by providing a high NOx purification rate and a low NH$_3$ oxidation rate at a low temperature of 250° C., at a high temperature of 500° C., etc. Therefore, the reduction catalyst according to the present invention is not limited to the application to an exhaust gas purifying catalyst but can be utilized for various applications in a wide field.

What is claimed is:

1. A NOx selective reduction catalyst, having a core/shell particle structure comprising a core part and a shell part,
   the core part containing copper-supported zeolite; and
   the shell part containing a composite oxide of Ti, Ce, W and S.

2. A NOx selective reduction catalyst, having a core/shell particle structure comprising a core part and a shell part:
   the core part containing copper-supported zeolite; and
   the shell part consisting of a composite oxide of Ti, Ce, W, and one selected from P or S.

* * * * *